Dec. 6, 1932. F. HOTCHNER Re. 18,679

DISCHARGE TUBE DISPLAY

Original Filed May 25. 1929 2 Sheets-Sheet 1

Inventor
Fred Hotchner
By Zabel & Banning

Dec. 6, 1932. F. HOTCHNER Re. 18,679

DISCHARGE TUBE DISPLAY

Original Filed May 25, 1929 2 Sheets-Sheet 2

Inventor
Fred Hotchner

By Zabel & Banning

Reissued Dec. 6, 1932

Re. 18,679

UNITED STATES PATENT OFFICE

FRED HOTCHNER, OF CHICAGO, ILLINOIS

DISCHARGE TUBE DISPLAY

Original No. 1,803,706, dated May 5, 1931, Serial No. 366,069, filed May 25, 1929. Application for reissue filed October 22, 1931. Serial No. 570,471.

This invention relates to a discharge tube display and the object thereof is to produce a display device making use of discharge tubes for the illumination thereof in which a considerable amount of advertising copy or ornamental design is illuminated without the necessity of forming up tubing for the entire amount of display matter shown.

It is a further object to provide a display in which a portion of the display matter may be readily changed without making any electrical connections.

It is a further object to provide a discharge tube display in which a high percentage of the radiation from the tubes which is ordinarily wasted by being sent off sideward is conserved and used to illuminate additional copy to that defined by the form of the tubes.

The formation of discharge tubes into small letters and designs is difficult and more costly than the expense justified by the value of small displays. Hence the application of discharge tubes to work such as window display and department indicators has been quite restricted. By this invention the benefit of the brilliant and attractive effects of these tubes is realized in such signs with a minimum of tube bending in the construction thereof.

A further object is to provide a portable discharge tube display in which the tubes are protected from injury and in which all electrical devices are self-contained.

Other objects of the invention have to do with various features which will hereinafter be more fully described and set forth in the appended claims.

Several embodiments of the invention are shown in the accompanying drawings.

Figure 1:
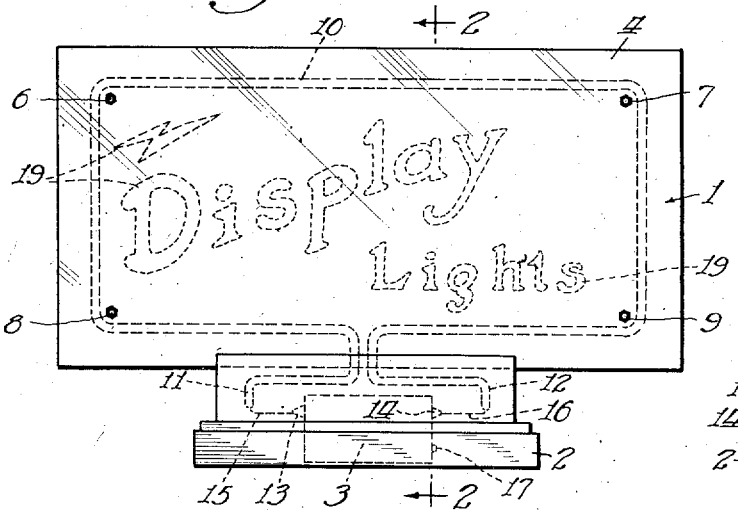
Figure 1 is a front elevation of a sign made according to this invention in which a discharge tube in the form of a border serves to illuminate advertising matter in the form of raised light reflecting characters within the border.
Figure 2:
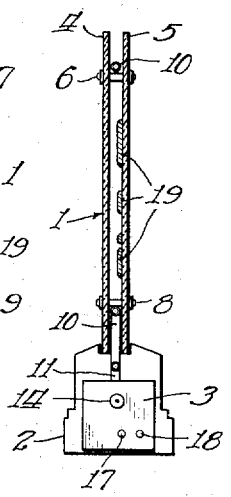
Figure 2 is a cross section thru the sign shown in Figure 1, taken on the line 2—2.

The sign shown in Figure 1, indicated by numeral 1, consists of a cabinet 2 enclosing a transformer 3 and supporting two extended, spaced sheets of transparent material such as glasses 4 and 5. The glasses are spaced apart by four spacer bolts 6, 7, 8 and 9. Between the glasses and extending around the border of the sign is the discharge tube 10, having the terminals 11 and 12 which extend into the cabinet and are connected to the terminals 13 and 14 of the transformer by the wires 15 and 16. The transformer is provided with the low tension terminals 17 and 18 which are connected in any suitable manner to the source of lighting current.

Secured to the back glass 5 are a plurality of raised characters of light reflecting material indicated by 19, 19, etc. The tube besides being exposed as a border serves to illuminate the characters by means of the light reflected by the inside surfaces of the glasses. It is to be noted that this light is that which is radiated from the tubes in an otherwise non-useful direction, that is, in other than normal angles of view. Thus a high percentage of the otherwise wasted light is conserved and used to illuminate the characters.

Figure 3:
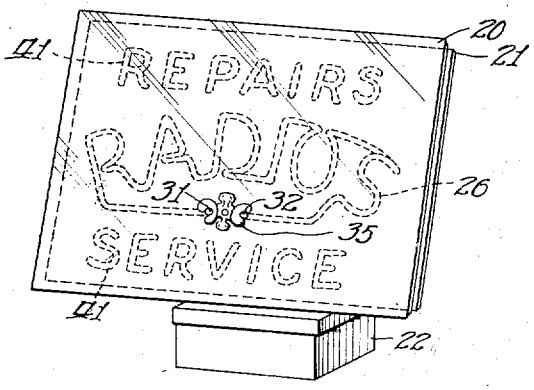
Figure 3 is a perspective view of another form of this invention in which a discharge tube in the form of a word serves to illuminate additional copy in the form of raised light reflecting characters positioned above and below the tube.
Figure 4:
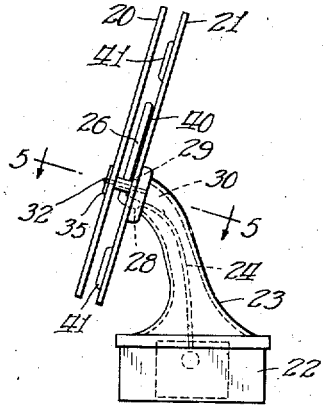
Figure 4 is a side elevation of the sign shown in Figure 3.

In the form of the invention shown in Figures 3 and 4 the discharge tube is in the form of a word, and serves to illuminate other copy above and below it. The glass plates 20 and 21 are supported from the cabinet 22 by the hollow arm 23 thru which the conductors 24 and 25 extend. The tube indicated by 26 has a pair of terminals 27 and 28 which extend thru the opening 29 in the plate 21 into the hollow 30 of the arm 23, and connect to the conductors. The glasses are supported and spaced apart by the screws 31 and 32 and the spacers 33 and 34 which hold them to the arm 23. The ornamental clamp piece 35 serves to deliver the strain to the front glass and the felt washers 36, 37, 38 and 39 provide a cushion for the spacers. The clamp piece also serves to conceal the terminals.

Figure 5:
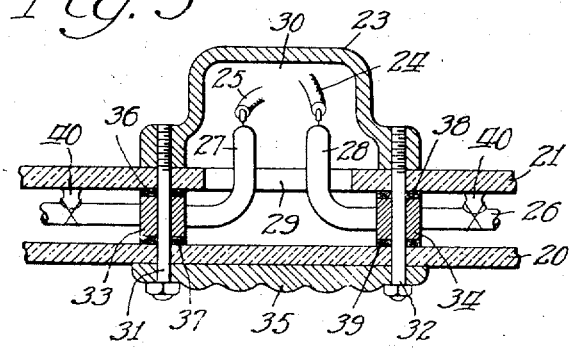
Figure 5 is a sectional view of a detail of the sign shown in the preceding views taken on the line 5—5, Figure 4.

The method of securing the various elements together is illustrated by the section in Figure 5. The tube 26 is supported by the posts 40, 40, etc. The characters 41, 41, etc., are made from glass, cement or any other suitable material and are cemented to the plate 21 as shown in Figures 3 and 4.

Figure 6:
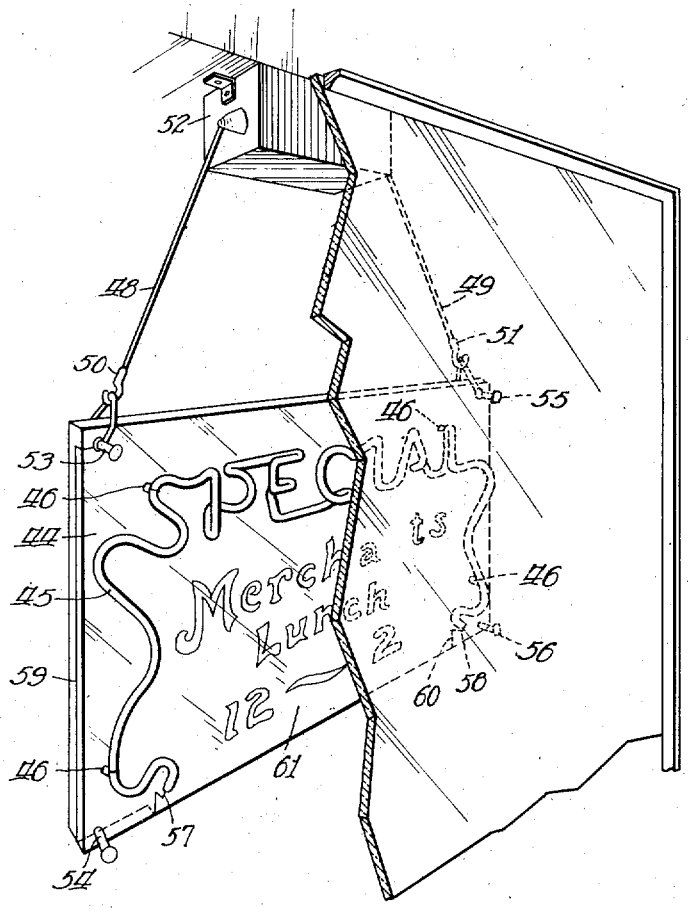
Figure 6 is a perspective view of a modification of this invention shown in the connection in which it is installed in a show window. In this form of the invention a tube in the form of a word and an ornamental border serves to illuminate copy which can be written on to the glass and changed at will.

In the form of the invention shown in Figure 6 a sign is provided for show window mounting. It is constructed with a single sheet of glass 44 to which the tube 45 is mounted by means of the posts 46, 46, etc. The window 47 thru which the sign is to be displayed is utilized in the place of the second glass, the reflections taking place between the front surface of the glass 44 and the rear surface of the window in the same manner as between the two glasses in the forms of the invention illustrated above.

The center of the glass 44 is clear of tubing for the reception of advertising copy which is written on the glass with any medium which will reflect the light and is capable of being quickly removed. It is to be understood that if desired raised letters may be here used as in the forms of the invention described above. The sign thus serves as an announcement sign and may be quickly changed. It is detachable from the supporting cords 48 and 49 at the hooks 50 and 51. The cords are insulated conductors and they depend from the terminals of the transformer 52 which is located out of the line of vision.

The sign is spaced from the window by means of the bumper posts 53, 54, 55 and 56. Connection is made to the terminals 57 and 58 by means of the conductors 59 and 60. To make changes in the sign, it is unhooked from the cords, thereby also breaking the electrical connection, and then taken to a convenient place, the old message washed off and new copy written in the space 61.

Figure 7:
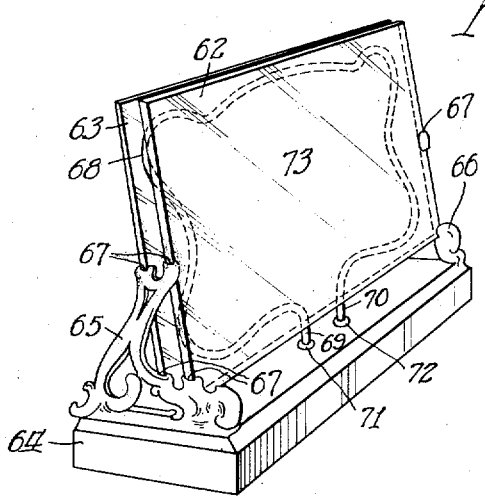
Figure 7 is a perspective view of a portable sign in which one glass is readily removable for the purpose of writing copy on the surface of the same to be illuminated by light from a tube in the form of an ornamental border.

Another embodiment of the invention is shown in Figure 7. The two glass plates 62 and 63 are supported apart and above the cabinet 64 by means of the cast brackets 65 and 66. Both glasses slide in slots in the brackets, indicated by 67, 67, etc., and may be conveniently removed for the purpose of writing messages on the surfaces of the glasses. It is to be understood that while I prefer to use the front surface of the rear glass, it is possible to use any surface at all for this purpose. The illumination is furnished by the ornamental border tube 68, the terminals 69 and 70 thereof extending thru the bushings 71 and 72 into the cabinet within which is contained a transformer. The space for copy in this case is indicated by 73.

Various methods may be used for providing the light reflecting characters in the various forms of this inventon. Permanent characters may be made by cementing onto the front surface of the rear glass such letters and figures as are commonly used for lettering show windows. Among them are the enameled copper, porcelain and glass letters. When the copy is to be changeable paint pigments or glass frosting may be used. Water colors which can be readily washed off are also suitable. A very efficient method of presenting copy that is to be permanent is to sandblast or etch the characters into the surface of either of the glasses.

In the generic sense the term "display pattern" includes any pattern of inscriptions, characters, figures, numerals, symbols, ornaments, designs, borders or signs, whether including but one of any of such devices, or a number of any one of such devices or any combination of such devices when used as an intended visible portion of the display according to this invention.

The invention may be made in many other forms than those particularly set forth herein, and therefore it is not to be limited by the particular forms illustrated but only by the prior art and the appended claims. In my Patent No. 1,818,918 which is a division of the original application herein, I claim a device of this character in which those portions of the display which receive their illumination from the illuminant are of such a character that they may be readily changed by the owner of the sign as distinguished from the manufacturer. Such signs I have designated "writable" signs as distinguished from signs in which the display characters in so far as the owner of the sign is concerned are permanent.

What I claim is:

1. In an electric display, a pair of extended spaced sheets of light transmitting material, a tubular light therebetween in the form of a display pattern, and another display pattern disposed between said sheets of light transmitting material and formed of light reflecting material, the second said pattern being so positioned as to be rendered luminous by radiation from said tubular light.

2. In an electric display, a pair of spaced sheets of light transmitting material, a tubular light therebetween exposed to view thru one of said sheets as part of the visible display, and means in the form of a display pattern between said sheets of light transmitting material for the purpose of catching and redirecting part of the radiation from said tubular light.

3. In an electric display, a show window, a sheet of light transmitting material, means to space said sheet of material from said show window, a discharge tube in the form of a display pattern and means to position said tube between said sheet of material and said window, non-luminous characters positioned between the near surfaces of said sheet of material and said window; the proportions and spacing of the said elements being such that said non-luminous characters are illuminated by radiation from said discharge tube.

4. In an electric display, a pair of spaced sheets of transparent material, a discharge tube in the form of a display pattern exposed to view as part of the visible display and positioned between said sheets of material, and a plurality of characters of light reflecting material positioned between the near surfaces of said sheets of material; the positioning of the said elements being such that the said characters are illuminated by radiation from said tube reflected back and forth between said sheets until it falls upon said characters.

5. In an electric display, a pair of sheets of material in spaced relationship to each other, the near surfaces of both said sheets being at least partially light reflecting and one of said sheets being light transmitting, a source of light therebetween forming part of the display and visible through the last said sheet, and means in the structure so formed to catch and redirect a portion of the radiation other than that which is directly transmitted out of said structure thru the last said sheet for the purpose of delineating a display pattern.

6. In an electric display, a pair of sheets of transparent material in spaced relationship to each other, a source of light therebetween exposed to view and in the form of a display pattern, and means in the structure so formed to catch and redirect a portion of the radiation other than that which is directly transmitted out of said structure thru said sheets of transparent material for the purpose of delineating another display pattern.

7. A display sign of the character described having a gaseous conduction light emitting display pattern forming part of the visible display and a light reflecting display pattern having a discontinuous surface also forming part of the visible display and receiving its light from said light emitting display pattern.

8. In an electric display, a pair of sheets of material in spaced relationship to each other the near surfaces of both of said sheets being at least partially light reflecting and one of said sheets being at least partially light transmitting, a source of light between said sheets in the form of a display pattern forming part of the visible display and visible by directly transmitted radiation thru the last said sheet, and another display pattern in the structure so formed having the property of redirecting radiation and so positioned as to intercept and redirect a portion of the radiation traversing the space between the near surfaces of said sheets thereby becoming luminous to the eye by redirected radiation transmitted thru the said light transmitting sheet.

9. In an electric display, a show window, a sheet of light transmitting material, means to space said sheet of material from said show window, a discharge tube in the form of a display pattern between said sheet of material and said show window, and another display pattern between the near surfaces of said sheet and said show window and formed of material capable of becoming luminous to the eye by redirected radiation, the relative positioning of all of said elements being such that a portion of the radiation from said discharge tube is transmitted directly thru said show window and a portion of the radiation is reflected back and forth between the near surfaces of said sheet and said show window thus illuminating the second said display pattern.

10. In an electric display, a show window, a sheet of material having a surface capable of reflecting at least a portion of the light rays falling upon it, means to space said sheet from said show window with the said surface closest to said show window, a discharge tube therebetween in the form of a display pattern, and another display pattern formed in the structure so formed and visible to the eye thru the said show window when illuminated and having the property of redirecting radiation falling upon it other than by pure reflection, the relative positioning of all of said elements being such that a portion of the radiation from said discharge tube is transmitted directly thru said show window and a portion of the radiation is reflected back and forth between the said sheet and the said show window thus illuminating the second said display pattern by radiation redirected thereby at an angle capable of passing thru said show window.

11. In a luminous display, a base, a pair of ornamental brackets extending upwards from said base, a pair of sheets of material supported by said brackets and extending from one to the other and supported above said base, at least one of said sheets being capable of transmitting light rays, a discharge tube between said sheets the terminals thereof extending into suitable connections in said base and means in said base to supply electric current to said terminals.

12. A display sign of the character described having a gaseous conduction light emitting display pattern forming part of the visible display, a glass plate associated therewith, and a light reflecting display pattern having a discontinuous surface also forming part of the visible display and receiving its light from said light emitting display pattern, a surface of said glass plate aiding by reflection to direct light from said light emitting display pattern to said light reflecting display pattern.

13. A display sign of the character described having a gaseous conduction light emitting display pattern forming part of the visible display, a glass plate associated therewith, and a light reflecting display pattern carried by said glass plate and having a discontinuous surface also forming part of the visible display and receiving its light from said light emitting display pattern, a surface of said glass plate aiding by reflection to direct light from said light emitting display pattern to said light reflecting display pattern.

14. A display sign of the character described having a gaseous conduction light emitting display pattern forming part of the visible display, a pair of parallelly arranged glass plates associated therewith, and a light reflecting display pattern having a discontinuous surface also forming part of the visible display and receiving its light from said light emitting display pattern, a surface of each of said glass plates aiding by reflection to direct light from said light emitting display pattern to said light reflecting display pattern.

15. A display sign of the character described having a gaseous conduction light emitting display pattern forming part of the visible display, a pair of parallelly arranged glass plates associated therewith and a light reflecting display pattern having a discontinuous surface also forming part of the visible display and receiving its light from said light emitting display pattern, the surfaces of said glass plates aiding by reflection to direct light from said light emitting display pattern to said light reflection display pattern.

In witness whereof, I herewith subscribe my name this 12th day of October, 1931.

FRED HOTCHNER.